Patented Apr. 29, 1952

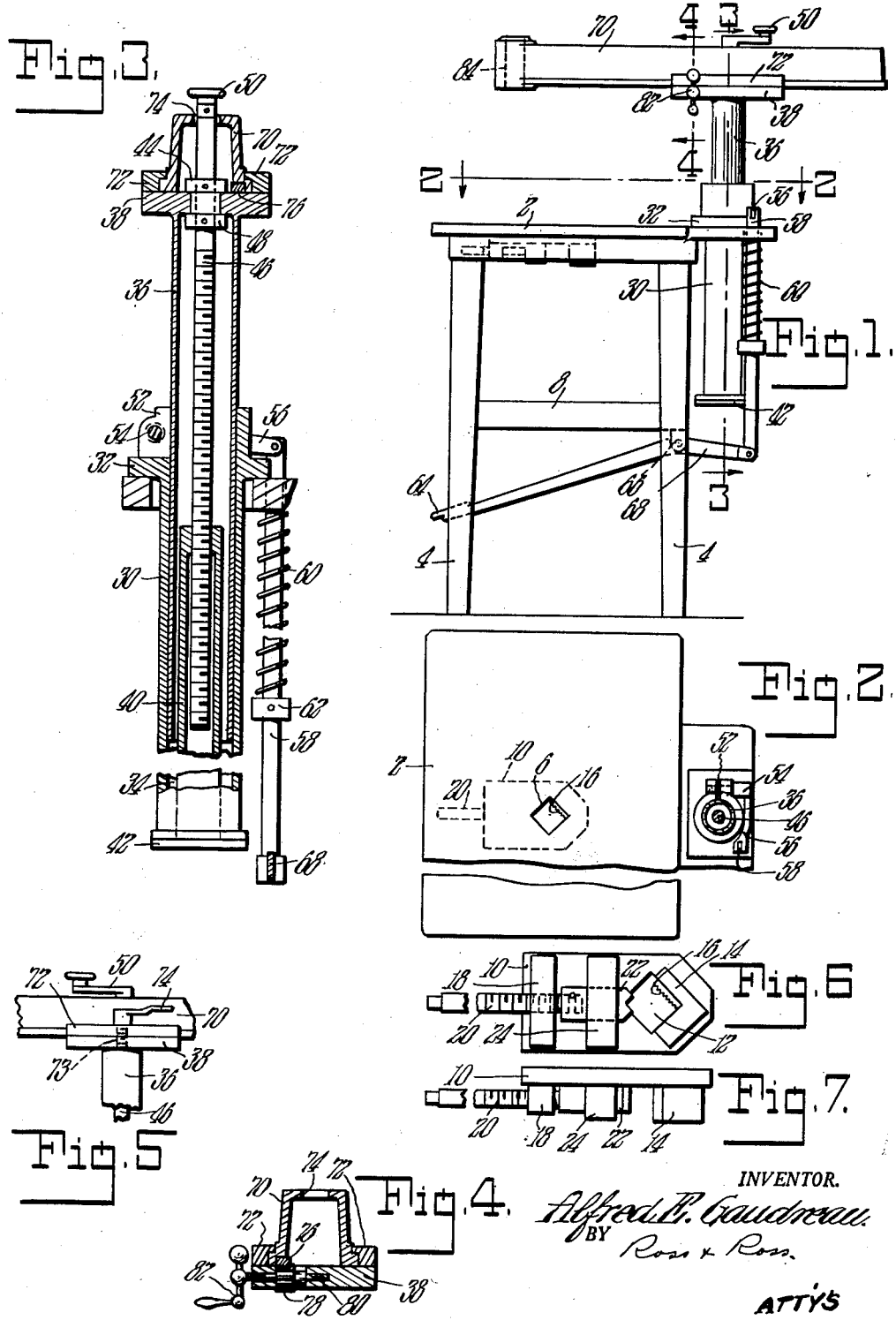

2,594,415

UNITED STATES PATENT OFFICE 2,594,415

MANUALLY OPERABLE MACHINE TOOL

Alfred E. Gaudreau, Springfield, Mass.

Application July 27, 1949, Serial No. 107,020

1 Claim. (Cl. 10—129)

This invention relates to improvements in apparatus for performing machining operations of various kinds and is directed more particularly to a machine for manual operation for tapping, threading, reaming and the like of work pieces.

The principal objects of the invention is the provision of a machine which is adapted and arranged for performing so-called "hand-operations" such as tapping, threading, reaming and the like on work pieces.

The machine of the invention is characterized by a work support having vise means associated therewith and tool guiding and holding mechanism which is movable in all directions for locating a tool as may be desired relative to work on the work support.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of a machine embodying the novel features of the invention;

Fig. 2 is a plan view on the line 2—2 of Fig. 1;

Figs. 3 and 4 are sectional elevational views on the lines 3—3 and 4—4 of Fig. 1;

Fig. 5 is a fragmentary side elevational view of the beam or arm of the machine shown in Fig. 1; and Figs. 6 and 7 are inverted plan and side elevational views respectively of the vise mechanism of the machine shown in Fig. 1.

Referring now to the drawings more in detail, the invention will be fully described.

A table 2 is provided which has supporting legs 4 secured thereto in the usual manner. The table is provided with an opening 6 therethrough for work and with a lower shelf 8 secured to said legs 4.

A vise is secured to the underside of the table and includes a plate 10 having an opening 12 in register with the opening 6 of the table. An angle jaw 14 is secured to the plate 10 and has a serrated jaw member 16 secured thereto. A member 18 secured to the plate 10 has a screw 20 in threaded engagement therewith and a jaw 22 is slidable in a member 24 which is secured to said plate 10.

The forward end of the screw is connected to the jaw so that as the screw is rotated in one direction or the other, a piece of work may be clamped and held between the forward end of the jaw and angle. The forward end of the jaw may take any form desired.

A vertically extending housing 30 has a flange 32 secured to the table and has a vertical longitudinal bore 34. A hollow elongated spindle 36 is reciprocable and rotatable in the bore of the housing and has a plate 38 secured to its upper end.

A hollow sleeve 40 extends upwardly in the bore of the housing and has a flange 42 closing the lower end thereof which is secured to the lower end of said housing.

A bushing 44 is rotatable in the plate 38 and a threaded stem 46 extends through the bushing and downwardly into the sleeve 40. A collar 48 fixed to the stem 46 below the plate 38 cooperates with the bushing to hold the stem against axial displacement relative to said plate. The upper end of the sleeve 40 threadedly engages the stem 46, as shown.

A crank 50 is secured to the upper end of the stem 46 for rotating it in opposite directions and accordingly the spindle is elevated or lowered relative to the table 2.

The upper end of the housing is split at 52 and a binding screw 54 in threaded engagement with the housing when turned in one direction will cause the housing to grip the spindle and prevent rotation thereof. When the said screw 54 is turned in an opposite direction the spindle is released for rotation.

A lever 56 extends from the screw and a vertically extending operating rod 58 has its upper end pivotally connected to said lever.

A spring 60 is disposed around said rod 58 between a collar 62 fixed thereto and said table 2 to urge the rod downwardly. A foot lever 64 is pivoted at 66 and has an end 68 which is pivoted to the lower end of rod 58.

The parts are preferably so arranged that by action of the spring 60 the spindle is normally clamped in the housing against rotation and is released for rotation by depressing the pedal 64.

An elongated arm or beam 70 is slidable back and forth on the plate 38 and is guided in such movements by gibs 72 at opposite sides thereof which are secured to said plate 38, see Figs. 3 and 4. An elongated slot 74 in the upper side of the beam is provided for clearing the member 50, see Fig. 4.

A screw 73 extends through one of the gibs 72 in engagement with the plate and has a manually engageable member secured thereto for turning said screw, see Fig. 5. As the screw is turned in one direction the gib is caused to clamp the beam to the plate against movement. When turned in an opposite direction the beam is released for sliding movements.

An elongated rack 76 having teeth along its lower side is secured within the beam 70 and a gear 78 fixed on a shaft 80 is in mesh with said rack. A manually engageable member 82 is fixed to said shaft 80 for rotating it in one direction or the other thereby to move the beam relative to the plate 38.

The beam 70 is provided with a bore 84 for the shank or arbor of a tool or for a tool holder.

It will be noted that the housing encloses the parts against contamination by foreign matter.

In the operation of the apparatus, a piece of work may be secured to the table by any suitable means or if desired said work may be clamped in the vise provided therefor.

The shank of a tool or a holder for a tool whether it be a tap, threading die, reamer or the like is inserted in the socket 84 of the beam. The spindle 36 is released for swinging by depressing the pedal 64 and the spindle may be elevated for elevating the beam by manipulating the member 50. Said beam may be moved back and forth by rotation of member 82.

In this way the tool may be located relative to the work as may be desired and when so located the pedal is released so that the spindle is automatically locked against rotation. The beam is locked to the spindle against longitudinal movements by the member 74.

As will be observed, the beam may be readily and easily adjusted to bring the tool to the desired location on the work without moving the work on the table.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A machine for locating a hand rotated tool relative to a work piece comprising in combination, a support having an upper horizontal work piece supporting face, an elongated tubular housing having an upper portion secured to a side of said support and extending vertically downwardly therefrom, an elongated tubular spindle rotatable and reciprocable in said housing having an upper portion extending upwardly from said support and housing and having an upper plate closing the upper end thereof, an elongated stem rotatably and non-reciprocably mounted in said plate extending downwardly into said tubular spindle and having a threaded lower end portion, an internally threaded sleeve engaging the lower end portion of said stem extending upwardly within said housing from the lower end thereof having a flange on the lower end thereof closing the lower end of the housing and secured thereto, the upper end of said housing provided with clamping means to releasably clamp and hold said tubular spindle aaginst reciprocation and rotation, said upper plate having guide means for a beam reciprocable horizontally, a beam reciprocable back and forth in said guide means in parallelism with the work supporting face of the support provided with a longitudinal slot and having a vertically disposed bore for rotatably receiving a hand operated tool in an end thereof, an upper end of said stem extending upwardly through the slot of said beam provided with manually engageable means for rotating the same, means for reciprocating said beam, and locking means for locking said beam against reciprocation, all adapted and arranged whereby a tool carried by said beam may be moved up and down relative to said support and swing in opposite directions or moved back and forth relative thereto.

ALFRED E. GAUDREAU.

REFERENCES CITED

The following references are of record in the file of this patent:

UNITED STATES PATENTS

| Number | Name | Date |
|---|---|---|
| 766,976 | Shek | Aug. 9, 1904 |
| 801,128 | Anderson | Oct. 3, 1905 |
| 949,965 | Shek | Feb. 22, 1910 |
| 1,708,420 | Klausmeyer | Apr. 9, 1929 |
| 2,242,792 | Panzer | May 20, 1941 |
| 2,254,046 | Pearson | Aug. 26, 1941 |
| 2,271,532 | Allmendinger | Feb. 3, 1942 |
| 2,336,947 | Marsilius | Dec. 14, 1943 |
| 2,356,087 | Prokul | Aug. 15, 1944 |
| 2,418,234 | McCullough | Apr. 1, 1947 |